Oct. 6, 1936.  J. C. SHUTT  2,056,331
PRESS
Filed Jan. 10, 1935

INVENTOR.
JOHN C. SHUTT
BY Kwis Hudson & Kent
ATTORNEYS

Patented Oct. 6, 1936

2,056,331

UNITED STATES PATENT OFFICE 2,056,331

PRESS

John C. Shutt, Wickliffe, Ohio, assignor to The Ohio Rubber Company, Cleveland, Ohio, a corporation of Ohio Application January 10, 1935, Serial No. 1,122

2 Claims. (Cl. 100—71)

The present invention relates to presses and more particularly to large vulcanizing presses particularly adapted to molding and/or vulcanizing large rubber or rubber covered articles, especially rubber covered running boards for automobiles.

Presses of the type referred to usually comprise a base, a head in the form of a heavy casting supported by four heavy columns positioned at the corners of the press, a movable ram underneath the head, a plurality of superposed platens between the head and ram, and two rows or columns of mold members, one on either side of the press, attached to adjacent sides of the head, ram, and superposed platens. In order to increase the capacity of the press and thereby increase production, a large number of superposed platens, or "decks" as they are sometimes called, are employed. In operation the presses are loaded and unloaded simultaneously from opposite sides.

Presses of the character referred to present numerous problems in design, construction and operation, especially because of their large size and the enormous pressures involved. Notwithstanding the fact that these presses are of a very heavy construction, the enormous pressures exerted thereby will bend or arch the head, ram, etc., and variations in the thickness of the molds on one side will cause an uneven application of the pressure to the molds on the other side, with the result that unequal pressures will be exerted on the different rows or columns of molds and nonuniform or defective articles produced. In the case of rubber covered running boards for automobiles the rubber may be thicker at certain portions than it should be and thinner than intended at others, and the rubber on those boards which have not been subjected to the required pressure will be improperly molded and/or vulcanized.

An object of the present invention is the provision of a novel press of the character referred to which will not be subject to the disadvantages of the prior art.

Another object of the present invention is the provision of a novel press of the character referred to comprising a separate ram or rams and separate platens for each of the two rows of mold members.

The invention resides in certain novel features and details of construction and combinations and arrangements of parts, and further objects and advantages thereof will be apparent to those skilled in the art to which it pertains from the following description of the preferred embodiment thereof described with reference to the accompanying drawing, in which Fig. 1 is a front elevation of a press embodying the present invention with parts shown in section on the line 1—1 of Fig. 3.

Figures 1, 2, 3:
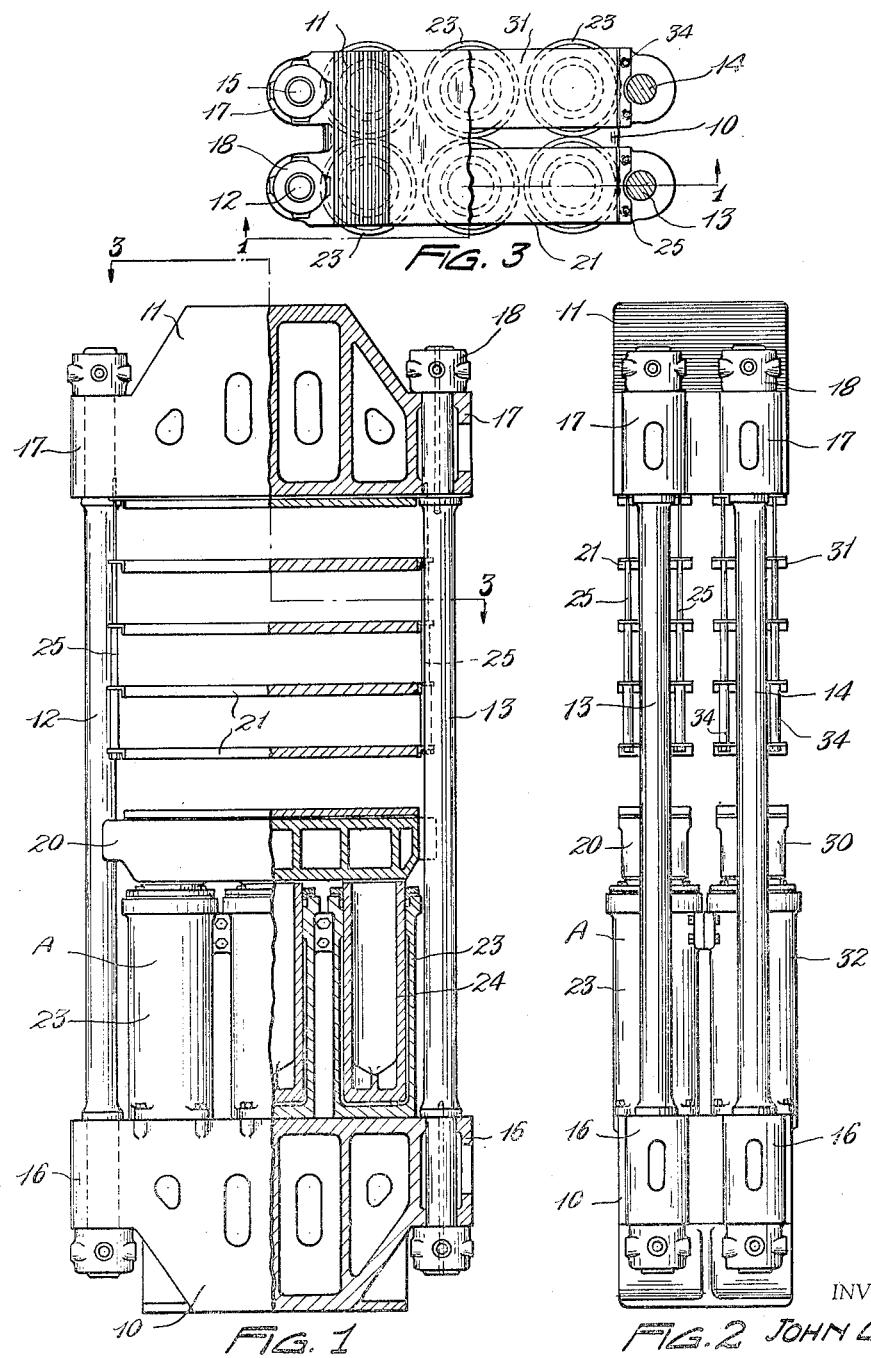
Fig. 2 is an end elevation of the press shown in Fig. 1.
Fig. 3 is a view on the line 3—3 of Fig. 1.

Referring to the drawing, the press illustrated therein is a large vertical hydraulic press, over twenty-three feet high and nine feet wide, especially designed for the manufacture of rubber covered automobile running boards. The base 10 consists of a large casting preferably steel reenforced to make the same extremely rigid. A head 11 also preferably made of cast steel and reenforced similarly to the base 10 is supported above the base 10 by a plurality of columns 12, 13, 14 and 15. The columns may be secured to the base and head in any convenient manner. In the embodiment illustrated the columns 12 to 15 inclusive project through bosses 16 and 17 formed integral with the base and head, respectively and are secured therein by large nuts 18.

According to the provisions of the present invention the press is provided with separate sets of rams and platens operated by independent power means. In the embodiment illustrated two sets of rams and platens are provided, operated by independent hydraulic motors. The front set, as viewed in Fig. 1, comprises the ram 20, platens 21, and three hydraulic motors. Each of the hydraulic motors comprises a cylinder 23 supported on the base 10 and a plunger 24 slidably supported thereon. The ram 20 is supported on the upper ends of the plungers 24 and is guided in its vertical movement on the thrust resisting columns 12 and 13.

The platens 21 are suspended from the head 11 by a plurality of rods 25 threaded into suitable tapped apertures therein and spaced from the ram 20. The platens 21 are slidably supported on the rods 25 which are made up of a plurality of sections of increasing diameter toward the lower end thereof. The apertures in the movable platens 21 correspond with the diameter of the different sections of the rods, that is the apertures in the upper movable platens are approximately the same as those of the upper section of the rods; the apertures in the next lower movable platens are approximately the same as those of the next lower section of the rods, etc. The construction is such that the platens 21 are held in predetermined spaced relation when the press is open without interfering with the operation of the press in closing.

The rear set of platens etc. comprising the ram 30, platens 31, hydraulic motors 32 and platen suspending and guiding rods 34 is a duplicate of the front section heretofore referred to and will not be described in detail. Both sets of hydraulic motors are connected to a suitable source of fluid pressure by conventional control means in the form of necessary valves etc., and may be operated independently of each other if desired. Preferably the hydraulic motors are operated simultaneously and are of the single action type, the weight of the ram etc. effecting the return stroke. While in the embodiment of the invention illustrated three motors are used on each side of the press, it is to be understood that any desired number of motors may be employed so long as there is an individual motor for each ram employed. Preferably a plurality of motors are employed on each side of the press as this construction gives a more uniform support for the rams and eliminates the flexure therein.

From the foregoing description of the preferred embodiment of the invention it is believed that the operation of the device will be apparent. It is also believed that it will be evident that the objects of the invention have been attained, and that a new and improved press of the character referred to has been provided. Variations in the thickness of the material, molds, platens, etc., on one side of the present press will not distort or affect the operation of the other side in any manner whatsoever and a uniform product will be produced.

While the preferred embodiment of the invention has been herein illustrated and described, I do not wish to be limited to the particular construction shown, which may be varied within the scope of this invention. This application is intended to cover any and all variations, adaptations, and uses therefor as come within the customary practice and skill of those in the art to which it pertains, and I particularly point out and claim as my invention the following:

1. In a vertical dual press of the character referred to the combination of a base, a head constituting the stationary abutment of the press, four posts connected to said base and said head for supporting said head in spaced vertical relation with reference to the base, said posts constituting stress resisting members and being located at the corners of a rectangle, a ram positioned between and guided by two of said posts and extending along one side of said press, a fluid pressure actuated motor supported by said base for moving said ram toward said head, a second ram positioned between and guided by the other two of said posts and extending along the opposite side of said press, and a second fluid pressure actuated motor supported by said base for moving said second ram toward said head, said rams being spaced apart and located between the head and the base on opposite sides of the central vertical plane of the press, each ram being located centrally with respect to the two corner posts which guide it.

2. In a vertical dual press of the character referred to the combination of a base, a head constituting the stationary abutment of the press, four posts connected to said base and said head for supporting said head in spaced vertical relation with reference to the base, said posts constituting stress resisting members and being located at the corners of a rectangle, a ram positioned between and guided by two of said posts and extending along one side of said press, a plurality of platens positioned between said ram and said head, means for supporting said platens, a fluid pressure actuated motor supported by said base for moving said ram toward said head, a second ram positioned between and guided by the other two of said posts and extending along the opposite side of said press, a plurality of platens positioned between said second ram and said head, means for supporting said platens, and a second fluid pressure actuated motor supported by said base for moving said second ram toward said head, the two rams being spaced apart and free of each other and the two sets of platens being spaced apart and free of each other, each ram and the platens above it being located on one side of the central vertical plane of the press centrally with respect to the two columns between which they are located.

JOHN C. SHUTT.